Nov. 23, 1926.

C. I. HALL 1,608,278

DEMAND METER

Filed Jan. 8, 1923          2 Sheets-Sheet 1

Inventor:
Chester I. Hall,
by *[signature]*
His Attorney.

Nov. 23, 1926.

C. I. HALL 1,608,278

DEMAND METER

Filed Jan. 8, 1923    2 Sheets-Sheet 2

Inventor:
Chester I. Hall,
by *Alexander S. —*
His Attorney.

Patented Nov. 23, 1926.

1,608,278

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

DEMAND METER.

Application filed January 8, 1923. Serial No. 611,395.

My invention relates to demand meters of the type described in Merz Patent No. 722,030 where a friction indicator is moved over a scale in accordance with the metered quantity by means of a periodically reset dog and has for its object to simplify the construction and improve the operation of this type of instrument.

In carrying my invention into effect, I combine the demand meter and the integrating type measuring instruments, the demand of which is to be recorded, in the same casing, drive the dog directly from the indicating meter and periodically reset the dog by restored energy received from a timing motor. By driving the dog directly from the integrating meter and resetting the same by stored energy received from the timing motor, I am able to simplify the construction and improve the operation of this type of instrument. In my improved demand meter, substantially no additional burden is imposed on the integrating meter and the dog is positively and substantially instantaneously returned to zero at the end of the timing interval. Other improved features of my invention will appear as the description proceeds.

Figure 1:
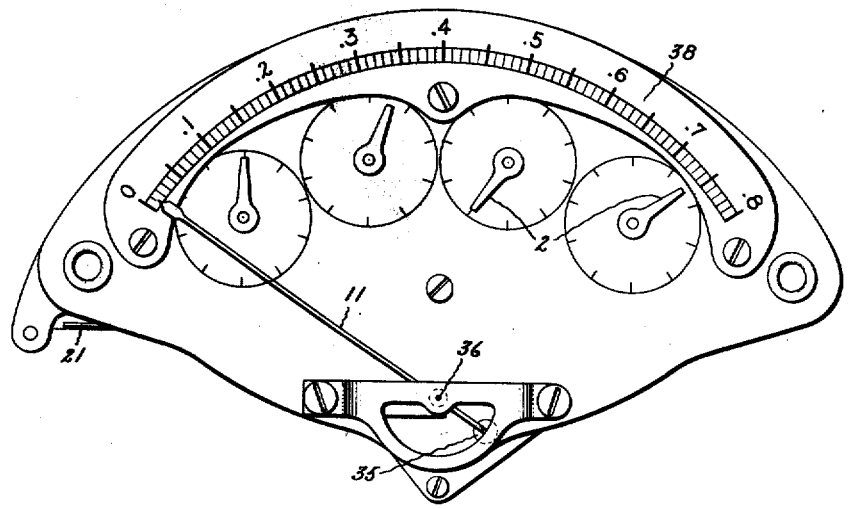
Figure 2:
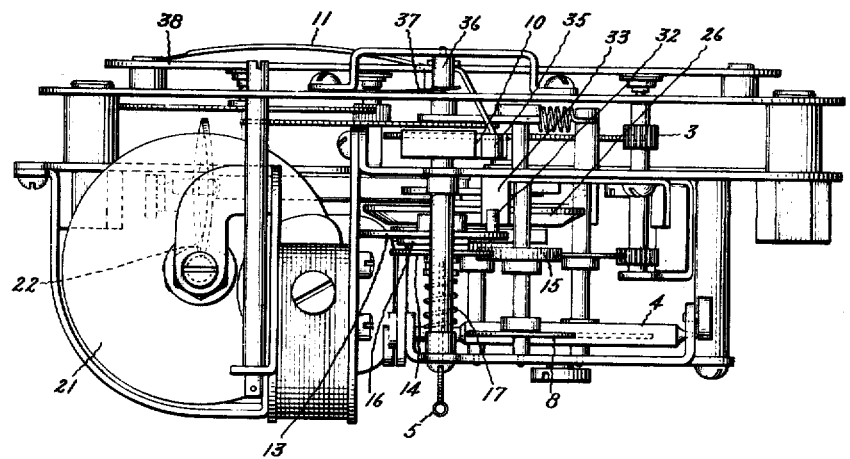
Figure 3:
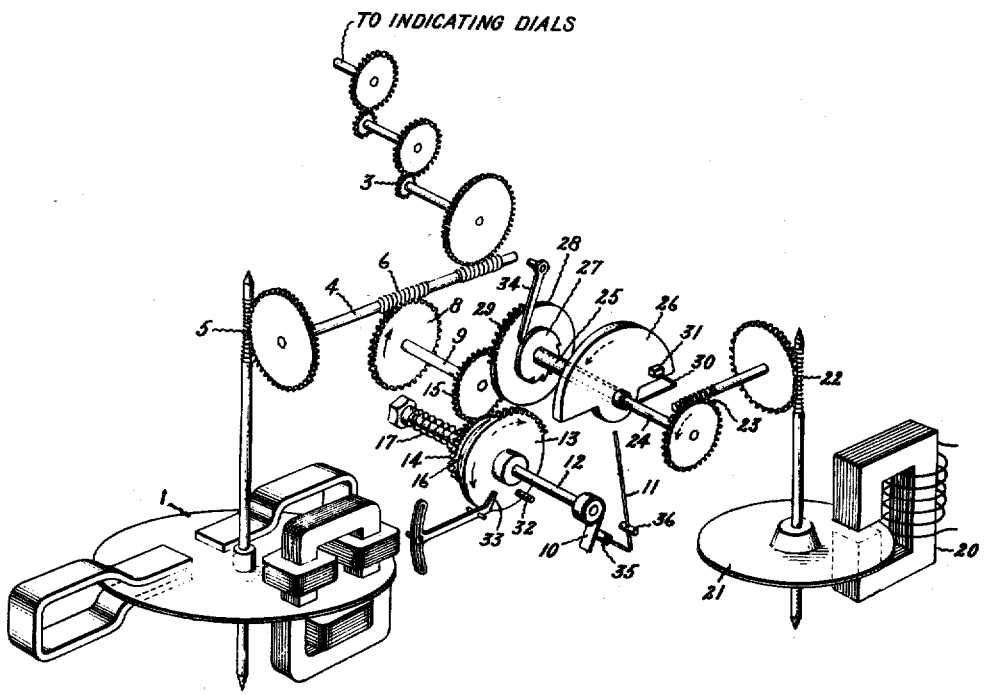
Figure 3A:
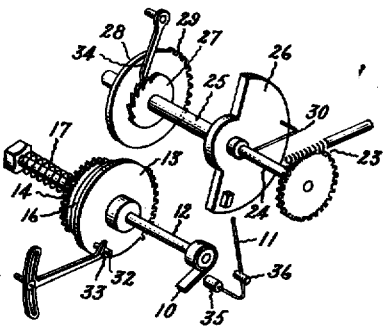
Figure 4:
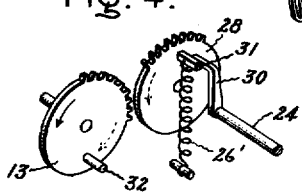

The features of my invention which I believe to be novel and patentable will be pointed out in the claims appended hereto. The preferred construction and the operation of my improved demand meter will now be explained in connection with the accompanying drawings in which Fig. 1 shows a face view of a portion of the combined instrument; Fig. 2 shows a bottom view of the parts shown in Fig. 1; Fig. 3 shows an exploded view of the essential parts of the invention to facilitate explanation; Fig. 3ª illustrates a different operating position of the parts shown in Fig. 3 and Fig. 4 shows a modified form of one of the parts. It should be noted in connection with Figs. 1 and 2 that these figures only show that portion of the combined instrument, made up as a unit, which contains the demand meter attachment and the dial bearing of the integrating type meter, the integrating meter itself being situated below and back of the unit shown.

Referring now to Fig. 3, 1 indicates an integrating type meter, the demand of which is to be measured. This meter drives the usual dial pointers 2 (see Fig. 1) through the usual reduction gearing designated in general by the numeral 3, shaft 4 and worm gear 5. Located on shaft 4 is an additional worm 6 which drives a worm gear 8 and a shaft 9 leading to the demand measuring apparatus. The dog 10 for pushing up the friction demand pointer 11 is secured to a shaft 12 to which is also secured a mutilated gear wheel 13. Rotatively mounted on shaft 12 is a gear 14 meshing with a gear 15 on shaft 9. Between gears 13 and 14 is a slip friction clutch 16 having its two parts fastened to gears 13 and 14 respectively. Gear 14 is biased toward gear 13 by means of an adjustable spring 17 so as to press the two parts of the clutch together. This mechanism provides a direct unrestrained mechanical drive in the direction of the full line arrows shown on the various parts between the meter 1 and the dog 10 of the demand attachment.

The means for returning the dog 10 to zero at the end of a desired time interval will now be explained. A constant speed induction motor comprising field member 20 and disc armature 21, such as described in my U. S. Patent No. 1386861, Aug. 9, 1921, is here shown as the timing element. As fully described in said patent, the speed of such a motor may be made substantially constant irrespective of the frequency and voltage fluctuations liable to be met with on commercial alternating current circuits. It will be obvious, however, that if desirable, the timing motor may comprise any other type of constant speed motor such as an ordinary spring driven clock movement. However, I prefer to use a constant speed electric motor because of its reliability and because the small space and weight required permits the same to be built into the unit shown in Fig. 2 in a very compact manner.

The timing motor drives a shaft 24 through suitable reduction gears 22 and 23. Rotatably mounted on shaft 24 is an overbalanced mutilated gear comprising a sleeve 25 which carries an eccentric weight 26, a ratchet wheel 27 and a mutilated gear wheel 28. The toothed portion 29 of gear wheel 28 is adapted to mesh with the toothed portion of gear wheel 13 when rotated into contact therewith. Secured to shaft 24 is an arm 30 having its outer end bent toward weight 26. On weight 26 is a projection 31 extending into the path of movement of arm 30. It will now be seen that with the timing motor operating at a constant speed, arm 30 will contact with extension 31 and raise weight 26 into the position shown in Fig. 3, at the same time rotating sleeve 25, ratchet wheel 27 and gear 28. The direction of rotation of the timing motor is such as to drive the parts in the direction indicated by the dotted line arrows. Any further rotation of sleeve 25 in the direction indicated will cause the weight 26 to be overbalanced so as to quickly rotate sleeve 25 and the parts carried thereby in the same direction. In so doing, the gear sector 29 meshes with gear wheel 13 and quickly and positively rotates the latter together with shaft 12 and dog 10 in the reverse direction to that in which said parts are driven by meter 1. A pin 32 on gear 13 and an adjustable stop 33 therefor is provided which determines the position to which gear 13 will be rotated by gear sector 29 and constitutes the zero setting of dog 10.

The gear 28 is mutilated so that it will not interfere with the movement of gear 13 except when the weight 26 swings downward from its overbalanced position. Gear 13 is mutilated so that its toothed portion will have just cleared with the toothed portion 29 of gear wheel 28 when the pin 32 comes against stop 33. Pin 32 is always moved against stop 33 irrespective of its position when the resetting device operates. The momentum of weight 26 will carry the toothed portion 29 out of the path of movement of the gear teeth 13 and the sleeve 25 and the parts carried thereby will be prevented from swinging back by reason of the pawl 34 which cooperates with ratchet wheel 27 and catches these parts at or near the highest point of the swing to which weight 26 will carry them. Thus the pawl 34 and ratchet wheel 27 prevent the overbalanced mutilated gear 28 from oscillating due to the eccentric weight 26. Furthermore, by catching weight 26 at the highest point of swing, the timing motor is relived of the work of raising the weight to this point during the next timing interval. Shaft 24, together with arm 30, makes one revolution for each resetting operation, for example, every 15 minutes. Arm 30 will thus follow the path of projection 31 until it again comes in contact therewith and will then slowly lift the weight to the possition shown in Fig. 3. In Fig. 3ª, I have represented the approximate position of the parts immediately after the resetting operation has been performed. The height to which weight 26 will swing will depend somewhat on the distance gear 13 must be set back.

During the resetting operation the clutch 16 between gears 13 and 14 slips. The over-balanced gear 28 rotates some distance by gravity before its toothed portion 29 meshes with gear 13, consequently the resetting operation is positive and substantially instantaneous. In other words, the potential energy of the weight is converted into kinetic energy before it is allowed to operate on gear 13, resulting in a hammer-blow effect. The irreversible gear drive at 6 prevents this operation from disturbing the operation of meter 1 in any way. It will be noted that during the normal operation of the instrument, that is while gears 13 and 29 are disengaged, there is nothing to restrain the movement of shaft 12 and the parts carried surfaces, consequently, the slip friction thereby except the friction of the bearing clutch 16 may be adjusted to slip very easily. This feature enables the meter 1 to continue in operation without appreciable error in case the demand attachment should become blocked. This feature also permits the use of a fairly light weight 26 for returning the dog 10 to zero position and since the additional work required of the timing motor in raising weight 26 from the position shown in Fig. 3ª to the position shown in Fig. 3 is distributed over a considerable period of time, the timing motor and the parts driven thereby may be made as small and delicate as desirable without the sacrifice of accuracy or reliability. If, for any reason the weight 26 should be brought to rest during the resetting operation before gears 29 and 13 clear each other, no harm will be done and an over registration of the demand pointer during the next time interval will not occur because, during said interval clutch 16 will slip and arm 30 will come into contact with projection 31 and positively drive gear 13 until pin 32 comes against stop 33 and the gears 29 and 13 are separated.

The toothed sectors of gears 28 and 13 are made sufficiently great, with a given gear ratio between them, to return the dog to its zero position from any position to which it may have been carried by the meter during a demand interval. If it should happen that the pointer 11 is moved to the highest point of the scale before the completion of a time interval, it will come against a suitable stop and injury to the device will be prevented by reason of the slipping of clutch 16. My improved resetting mechanism permits the gear ratio between gears 28 and 13 to be so chosen that an unusually long scale may be used. This feature, together with the substantially instantaneous resetting feature, permits the demand for a full time interval to be very accurately indicated. With the scale shown in Fig. 1 I have found that a gear ratio of 1:1 gives a very satisfactory result.

As illustrated in Fig. 4, the over-balancing means for gear 28 may comprise a spring 26' instead of a weight. The spring 26' is so secured as to be constrained by the timing motor operating, through shaft 24 and arm 30 on projection 31, through a portion of the timing interval and to be suddenly released when the projection 31, to which one end of the spring is fastened, is rotated beyond the dead center position illustrated in Fig. 4. Any further rotation in the direction indicated will cause gear 28 to rapidly rotate approximately 180 deg. and in so doing, perform the resetting operation as previously described. This operation will bring the spring to its unrestrained condition. In the appended claims I intend to include such modifications by the use of the expression "overbalanced gear," unless the claim is otherwise limited.

The complete operation of the device may be explained as follows: When the meter reader comes to read the meter, he takes down the integrated reading from the integrating dial and the maximum demand indication from the position of demand pointer 11. He then moves the demand pointer back to zero or until its lower end 35 contacts with dog 10. The timing motor is operating at the correct speed to rotate shaft 24 once during the desired time interval. The direction of rotation of the parts when driven from meter 1 is indicated by full line arrows and the rotation of the parts driven by or in response to the timing motor is indicated by dotted line arrows in Fig. 3. The meter 1 operating through gears 5, shaft 4, gears 6 and 8, shaft 9, gears 15 and 14, and clutch 16, drives shaft 12 and dog 10 to move the friction pointer 11 up the scale until the next resetting period. The resetting operation occurs when arm 30 has lifted weight 26 to the overbalanced position. Then the weight falls and in so doing, rotates sleeve 25 together with ratchet wheel 27 and gear wheel 28. The toothed portion 29 of wheel 28 after it has gained considerable momentum comes in contact with the toothed portion of gear 13 and substantially instantaneously and positively drives the latter together with shaft 12 and dog 10 to a position where pin 32 abuts against stop 33. At this instant, the toothed portions of gears 29 and 13 are disengaged and the momentum gained by the falling weights swings the toothed portion 29 out of reach of gear 13 to some such position as indicated in Fig. 3ᵃ where it is prevented from returning by pawl 34, cooperating with ratchet wheel 27. During the resetting operation, pointer 11 stays to where it was previously moved by dog 10, clutch 16 slips, pawl 34 rides over the smooth portion of ratchet wheel 27 and one or more teeth and meter 1 and the timing motor continue their normal operation. As soon as dog 10 is reset to zero, it again starts to advance in accordance with the speed of rotation of meter 1 and if the average speed of the meter is greater during the next interval than it was during the preceding interval, pointer 11 will be moved up accordingly. During subsequent time intervals the pointer 11 will remain in the maximum position to which it has been moved by dog 10 in any preceding time interval. The resetting operation is substantially instantaneous so that no appreciable time is lost between intervals, consequently, the demand pointer 11 will indicate accurately the maximum demand which has occurred during any preceding full time interval.

For the purposes of illustration the dog 10 and pointer 11, which is pivoted at 36, are shown on the opposite end of shaft 12 in Fig. 3 from their actual position when assembled in the unit shown in Fig. 2. The pointer 11 is frictionally held in any position to which it is moved by means of a light spring 37 shown in Fig. 2. Pointer 11 cooperates with scale 38 which it will be noted is somewhat more open than the usual demand meter scale. It will be seen from an inspection of Fig. 2 that the demand meter, together with the timing motor, may conveniently be assembled in a compact unit with the dial gearing of the integrating meter. The comparatively few simple parts and the small torque required of the timing motor makes my improved demand meter light in weight, inexpensive to build and economical in maintenance and operation while the principle of operation assures that both the integrated meter readings and the demand reading will be accurate.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In combination, an integrating type meter and means for measuring the maximum demand thereof, comprising a friction indicator, a dog driven directly from said meter for advancing said indicator, a timing motor, and means mechanically driven by said timing motor for substantially instantaneously driving said dog to a zero position at regularly recurring intervals.

2. In combination, an integrating type meter and means for measuring the maximum demand thereof comprising a friction indicator, a dog for advancing said indicator, and unrestrained mechanical driving connections between said dog and meter including a slip friction clutch and an irreversible gear drive between said clutch and meter, a timing motor, and means driven by said motor for substantially instantaneously driving said dog to a zero position at regularly recurring intervals.

3. In a demand meter, a dog, an eccentrically pivoted weight associated with said dog for returning the same to a zero position, a constant speed timing motor for driving said weight, and a lost motion driving connection between said motor and weight, said parts being arranged so that the weight in falling, substantially instantaneously drives the dog to a zero position.

4. In a demand meter of the type having a periodically reset dog, means for performing the resetting operation comprising a timing motor which determines the timing interval, a mutilated gear wheel secured to the dog, an overbalanced mutilated gear wheel, driven by the timing motor through a lost motion connection, said parts being so arranged that said gears mesh when the overbalanced gear is rotated by gravity to substantially instantaneously move the dog to its zero position, and means for preventing a backward rotation of said overbalanced gear.

5. A demand meter comprising a friction pointer, a dog for advancing said pointer, means for advancing said dog in accordance with the demand to be measured, a slip friction clutch between said dog and said advancing means, a mutilated gear secured to said dog, a timing motor, an overbalanced mutilated gear driven through a lost motion connection by the timing motor, said parts being so arranged that said overbalanced gear freely rotates by the force of gravity through substantially 180 degrees and in so doing, meshes with said other gear, substantially instantaneously drives the dog to its zero position and rotates out of mesh, and means for preventing a backward rotation of said overbalanced gear.

6. In a demand meter of the type having a periodically reset dog, means for performing the resetting operation comprising a timing motor, a mutilated gear wheel secured to the dog, an overbalanced mutilated gear wheel driven by the timing motor through a lost motion connection, said parts being so arranged that said gears mesh when the overbalanced gear rotates by gravity to substantially instantaneously drive the dog to its zero position and an adjustable abutment for stopping the dog when it reaches the zero position, the toothed portion of said gears being such that they are rotated out of mesh when the dog has been rotated to its zero position.

7. In combination, an integrating type meter and means for measuring the maximum demand thereof, comprising a friction pointer, a dog for advancing said pointer driven by said meter through an unrestrained mechanical driving connection including a slip friction clutch, a timing motor, means for storing sufficient of the energy of said timing motor during a timing interval to overcome the friction of said clutch and substantially instantaneously drive said dog to a zero position, a normally disengaged driving connection between said energy storing means and said dog adapted to be established when said energy storing means is released and interrupted when said dog is returned to its zero position, and means operated by said timing motor at regularly recurring intervals for releasing said energy storing means.

8. In a demand meter of the type having a periodically reset dog, a constant speed timing motor, means operated by said timing motor through a lost motion connection for storing energy received from said timing motor during a portion of the timing interval and releasing the same at the end of a timing interval, and means responsive to the release of said energy storing means and driven thereby for normally substantially instantaneously resetting said dog to its zero position, said lost motion connection being so arranged that said motor will directly drive said dog to its zero position in case the energy storing means fails in its operation.

9. A demand meter having a scale cooperating with a friction pointer, a dog for advancing said pointer over said scale in accordance with the demand of the metered quantity, means for periodically resetting said dog to a zero position comprising a mutilated gear secured to the dog and having the same axis of rotation, an overbalanced mutilated gear positioned to have its toothed sector rotated into mesh with said first mentioned gear and means for rotating said overbalanced gear in a direction to reset the dog to zero consisting of a uniformly rotated shaft and a lost motion driving connection between said shaft and the overbalanced gear whereby the latter is caused to be slowly driven by said shaft for a portion of one revolution and rapidly rotated by the overbalancing means a different portion of a revolution during each timing interval, the toothed sector of the overbalanced gear being so positioned with respect to the overbalancing means that said gear is caused to move rapidly when said gears are in mesh whereby the resetting operation is substantially instantaneous.

10. A demand meter according to claim 10, characterized by the fact that the toothed sector of the mutilated gear connected to the dog and the gear ratio between the two gears are such as to permit the use of an abnormally open scale for the demand meter.

11. In a demand meter of the type having a periodically reset dog, means for periodically performing the resetting operation comprising a pair of mutilated gears adapted to have their toothed sectors meshed, one of said gears being connected to the dog, means for causing the other gear to make a complete revolution during a timing interval in a direction to drive the dog to zero position and means for causing the speed of rotation of said last mentioned gear to vary from zero to a relatively high rate during the timing interval, the toothed sector of said last mentioned gear being so related to its driving means that its speed of rotation is a maximum when said gears are in mesh.

In witness whereof, I have hereunto set my hand this second day of Jan., 1923.

CHESTER I. HALL.

prising a pair of mutilated gears adapted to have their toothed sectors meshed, one of said gears being connected to the dog, means for causing the other gear to make a complete revolution during a timing interval in a direction to drive the dog to zero position and means for causing the speed of rotation of said last mentioned gear to vary from zero to a relatively high rate during the timing interval, the toothed sector of said last mentioned gear being so related to its driving means that its speed of rotation is a maximum when said gears are in mesh.

In witness whereof, I have hereunto set my hand this second day of Jan., 1923.

CHESTER I. HALL.

Certificate of Correction.

It is hereby certified that in Letters Patent No. 1,608,278, granted November 23, 1926, upon the application of Chester I. Hall, of Fort Wayne, Indiana, for an improvement in "Demand Meters," errors appear in the printed specification requiring correction as follows: Page 1, line 15, for the word "restored" read *stored;* page 2, line 79, strike out the words "surfaces, consequently, the slip friction" and insert the same to follow after the word "bearing" in line 80; and that the said Letters Patent should be read with these corrections therein that the same may conform to the record of the case in the Patent Office.

Signed and sealed this 28th day of December, A. D. 1926.

[SEAL.]

M. J. MOORE,
*Acting Commissioner of Patents.*

Certificate of Correction.

It is hereby certified that in Letters Patent No. 1,608,278, granted November 23, 1926, upon the application of Chester I. Hall, of Fort Wayne, Indiana, for an improvement in "Demand Meters," errors appear in the printed specification requiring correction as follows: Page 1, line 15, for the word "restored" read *stored;* page 2, line 79, strike out the words "surfaces, consequently, the slip friction" and insert the same to follow after the word "bearing" in line 80; and that the said Letters Patent should be read with these corrections therein that the same may conform to the record of the case in the Patent Office.

Signed and sealed this 28th day of December, A. D. 1926.

[SEAL.]

M. J. MOORE,
*Acting Commissioner of Patents.*